US 8,695,348 B2

(12) United States Patent
Omae et al.

(10) Patent No.: US 8,695,348 B2
(45) Date of Patent: Apr. 15, 2014

(54) COMBUSTOR AND GAS TURBINE

(75) Inventors: Katsuyoshi Omae, Tokyo (JP); Kenta Taniguchi, Tokyo (JP); Yoshitaka Terada, Takasago (JP); Takashi Onozuka, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 840 days.

(21) Appl. No.: 12/913,114

(22) Filed: Oct. 27, 2010

(65) Prior Publication Data

US 2011/0239619 A1    Oct. 6, 2011

(30) Foreign Application Priority Data

Mar. 30, 2010    (JP) ................................ 2010-079007

(51) Int. Cl.
*F02C 7/22*    (2006.01)
(52) U.S. Cl.
USPC ................... 60/739; 60/740; 60/747; 60/746; 60/734
(58) Field of Classification Search
USPC ........... 60/746, 796, 734, 798, 804, 737, 739, 60/740, 39.37, 747, 39.463
See application file for complete search history.

(56) References Cited

U.S. PATENT DOCUMENTS

| | | | |
|---|---|---|---|
| 4,955,191 A * | 9/1990 | Okamoto et al. | 60/39.3 |
| 6,622,488 B2 * | 9/2003 | Mansour et al. | 60/740 |
| 6,820,425 B2 * | 11/2004 | David et al. | 60/743 |
| 6,957,537 B2 * | 10/2005 | Hirasaki | 60/746 |
| 2004/0237531 A1 | 12/2004 | Hirasaki | |
| 2004/0250547 A1 * | 12/2004 | Mancini et al. | 60/740 |
| 2005/0028532 A1 * | 2/2005 | Bernero et al. | 60/776 |

FOREIGN PATENT DOCUMENTS

| | | |
|---|---|---|
| JP | 3495730 B2 | 2/2004 |
| JP | 2004-068997 A | 3/2004 |
| JP | 4326324 B2 | 9/2009 |

OTHER PUBLICATIONS

International Search Report of PCT/JP2010/068686, date of mailing Nov. 16, 2010.
Written Opinion of The International Searching Authority dated Nov. 16, 2010, issued in corresponding International Application No. PCT/JP2010/068686, with English Translation.

* cited by examiner

*Primary Examiner* — Phutthiwat Wongwian
*Assistant Examiner* — Steven Sutherland
(74) *Attorney, Agent, or Firm* — Westerman, Hattori, Daniels & Adrian, LLP

(57) ABSTRACT

A combustor of the present invention includes: a plurality of nozzles which is arranged around the central axis of a combustor and of which each base end is connected to an oil supply tube; a nozzle tube base which supports the plurality of nozzles and includes an oil chamber supplying fuel to the nozzles via an oil inflow portion provided in each oil supply tube; a first guide portion which faces the center of the combustor inside the oil chamber and guides the oil remaining inside the oil chamber to the oil inflow portion; and a second guide portion which faces the base end of the combustor inside the oil chamber and guides the oil remaining inside the oil chamber to the oil inflow portion.

10 Claims, 11 Drawing Sheets

COMBUSTOR AND GAS TURBINE

TECHNICAL FIELD

The present invention relates to a combustor and a gas turbine.

Priority is claimed on Japanese Patent Application No. 2010-079007, filed Mar. 30, 2010, the content of which is incorporated herein by reference.

BACKGROUND ART

Combustors used in gas turbines are classified into a gas combustion type, an oil combustion type, and a dual type, which is a combination of the gas combustion and oil combustion types. Among them, the oil combustion type or dual type combustor is equipped with a fuel oil supply system in order to supply fuel oil to a plurality of nozzles arranged around the central axis of the combustor. The fuel oil supply system includes a plurality of oil supply tubes and an oil chamber. Each of the oil supply tubes connects the base end of each nozzle to the oil chamber. The oil chamber is formed inside a nozzle tube base supporting the base end of each nozzle, and communicates with each nozzle via each supply tube.

In the oil combustion type or dual type combustor, when oil combustion is stopped or oil combustion is switched to gas combustion in the dual type, the fuel oil from the oil chamber of the combustor needs to be sufficiently removed. This is because the fuel oil inside the oil chamber is carbonized (caulked) due to heat transferred from a casing and there is a possible that the carbonized fuel oil blocks the oil supply tube or the fuel oil ejection portion at the front end of the nozzle when the fuel oil remains in the oil chamber. When the oil supply tube or the fuel oil ejection portion is blocked, the gas turbine needs to be cleaned during stopping the operation thereof. For this reason, the operating efficiency of the gas turbine degrades.

In the following Patent Literature 1, the oil chamber is formed to have a cross-star-shaped cross-section when viewed in the axial direction, fuel is transferred on a curved surface forming the inner wall of the oil chamber to be guided toward the supply path, and the fuel is blown away by compressed air to be discharged to the outside, thereby reducing the amount of the fuel remaining inside the oil chamber.

CITATION LIST

Patent Literature

PTL 1: JP-A-2003-307309

SUMMARY OF INVENTION

Technical Problem

However, in the related art, a problem arises in that the fuel oil may not be sufficiently removed from the oil chamber when discharging the fuel oil from the oil chamber.

The present invention is contrived in consideration of such circumstances, and an object of the present invention is to sufficiently remove the fuel oil in the oil chamber when discharging the fuel oil from the oil chamber.

Solution to Problem

In order to achieve the above-described object, the present invention adopts the following means.

That is, a combustor of the present invention includes: a plurality of nozzles which is arranged around the central axis of a combustor and of which each base end is connected to an oil supply tube; a nozzle tube base which supports the plurality of nozzles and includes an oil chamber supplying fuel to the nozzles via an oil inflow portion provided in each oil supply tube; a first guide portion which faces the center of the combustor inside the oil chamber and guides the oil remaining inside the oil chamber to the oil inflow portion; and a second guide portion which faces the base end of the combustor inside the oil chamber and guides the oil remaining inside the oil chamber to the oil inflow portion, wherein the first guide portion includes a first inclination surface that is located between the adjacent oil inflow portions and is inclined in a direction away from the center of the combustor as it becomes closer to one oil inflow portion and a second inclination surface that is inclined in a direction away from the center of the combustor as it becomes closer to the other oil inflow portion, and wherein the second guide portion includes a third inclination surface that is located closer to the vicinity of the front end of the combustor than the oil inflow portion and is inclined in a direction away from the center of the combustor as it becomes closer to the oil inflow portion.

With such a configuration, since the oil chamber includes the first guide portion, the first inclination surface of the first guide portion guides the fuel oil to one oil inflow portion, and the second inclination surface guides the fuel oil to the other oil inflow portion when discharging the fuel oil from the oil chamber. In addition, since the oil chamber includes the second guide portion, the third inclination surface of the second guide portion guides the fuel oil on the second guide portion toward the oil inflow portion. In other words, the fuel oil between two adjacent oil inflow portions is guided toward at least one of the two oil inflow portions, and the fuel oil reaching the second guide portion is guided toward the oil inflow portion. Accordingly, since the fuel oil is collected and discharged from the oil inflow portion, it is possible to sufficiently remove the fuel oil.

In particular, when the central axis of the combustor is inclined with respect to the horizontal direction, and the oil inflow portion (the upstream side) of the oil supply tube is higher than the downstream side, the fuel oil easily remains on the downstream side of the oil inflow portion in the axial direction of the combustor. However, since the fuel oil is guided to the oil inflow portion by the second guide portion, it is possible to sufficiently remove the fuel oil.

The angle formed between the third inclination surface and the central axis of the combustor may be larger than the angle formed between the central axis of the combustor and the horizontal line.

In this case, since the angle formed between the third inclination surface of the second guide portion and the central axis of the combustor is larger than the angle formed between the central axis of the combustor and the horizontal line, it is possible to further reliably remove the fuel oil.

The oil inflow portion may come into contact with an area which is a part of the inner surface of the oil chamber and is the farthest from the center of the combustor.

In this case, since the oil inflow portion comes into contact with an area which is a part of the inner surface of the oil chamber and is the farthest from the center of the combustor, it is possible to suppress the fuel oil from remaining in the radial gap between the oil inflow portion and an area which is a part of the inner surface of the oil chamber and is the farthest from the center of the combustor.

The oil inflow portion may include a base end opening which is formed in the oil supply tube and is opened toward the base end of the combustor.

In this case, since the oil inflow portion includes the base end opening which is opened toward the base end of the combustor, it is possible to allow the fuel oil to flow into the oil supply tube in a simple configuration.

The oil inflow portion may include a perforation hole which is formed in a tube wall of the oil supply tube.

In this case, since the oil inflow portion includes the perforation hole formed in the tube wall, it is possible to allow the fuel oil to flow into the oil supply tube from the perforation hole.

The oil chamber may include a third guide portion which faces the outer periphery of the combustor inside the oil chamber, is formed to be convex outward in the radial direction of the combustor, and guides the oil remaining inside the oil chamber to the oil inflow portion.

In this case, since the third guide portion faces the outer periphery of the combustor inside the oil chamber, is formed to be convex outward in the radial direction of the combustor, and guides the oil remaining in the oil chamber to the oil inflow portion, the fuel oil from the oil chamber is guided downward along the third guide portion. Accordingly, since the fuel oil is consequently collected and discharged from the oil inflow portion, it is possible to sufficiently remove the fuel oil.

The nozzle tube base may include a plurality of the oil chambers.

In this case, since the nozzle tube base includes the plurality of oil chambers, when the fuel oil is supplied to one oil chamber, and the supply of the fuel oil to the other thereof is stopped, it is possible to easily perform the partial load operation by ejecting the fuel oil only from the nozzle corresponding to the oil chamber to which the fuel oil is supplied. Further, since the fuel oil is suppressed from remaining by providing the plurality of oil chambers, it is possible to perform the partial load operation and the rated load operation, and to promptly switch the partial load operation to the operation stop or vice versa.

The nozzle tube base may be formed by a combination of a first member including the first guide portion and a second member including the second guide portion, and the second member may be disposed in the central axial direction of the combustor to overlap with the first member.

In this case, since the nozzle tube base includes the first member having the first guide portion and the second member having the second guide portion, the structure thereof is simple, and hence the assembling efficiency and the processing efficiency are excellent.

The base end opening of the oil inflow portion may face the first member, and the oil supply tube may penetrate the second member.

In this case, since the first member faces the oil inflow portion and the oil supply tube is inserted through the second member, the structure thereof is simple, and hence the assembling efficiency and the processing efficiency are excellent.

A gas turbine of the present invention includes: a compressor which compresses a hydraulic fluid; the above-described combustor which burns the hydraulic fluid compressed by the compressor; a turbine which is driven by the hydraulic fluid burned by the combustor.

According to the gas turbine of the present invention, since the gas turbine includes the above-described combustor, when the oil combustion is stopped or the oil combustion is switched to the gas combustion in the dual type, it is possible to sufficiently remove the fuel oil from the oil chamber of the combustor. Accordingly, it is possible to prevent the fuel oil supply system from being blocked by the carbonized fuel oil. Further, when the combustor is activated or the gas fuel is not stably supplied in the dual type, it is possible to promptly and stably perform the oil combustion even in a backup operation or the like, and to improve the operational reliability of the gas turbine.

Advantageous Effects of Invention

According to the combustor of the present invention, it is possible to sufficiently remove the fuel oil from the oil chamber when discharging the fuel oil from the oil chamber.

Further, according to the gas turbine of the present invention, it is possible to improve the operational reliability by sufficiently removing the fuel oil from the oil chamber.

DESCRIPTION OF EMBODIMENTS

Hereinafter, the preferred embodiments of the invention will be described with reference to the accompanying drawings.

First Embodiment

Figure 1:
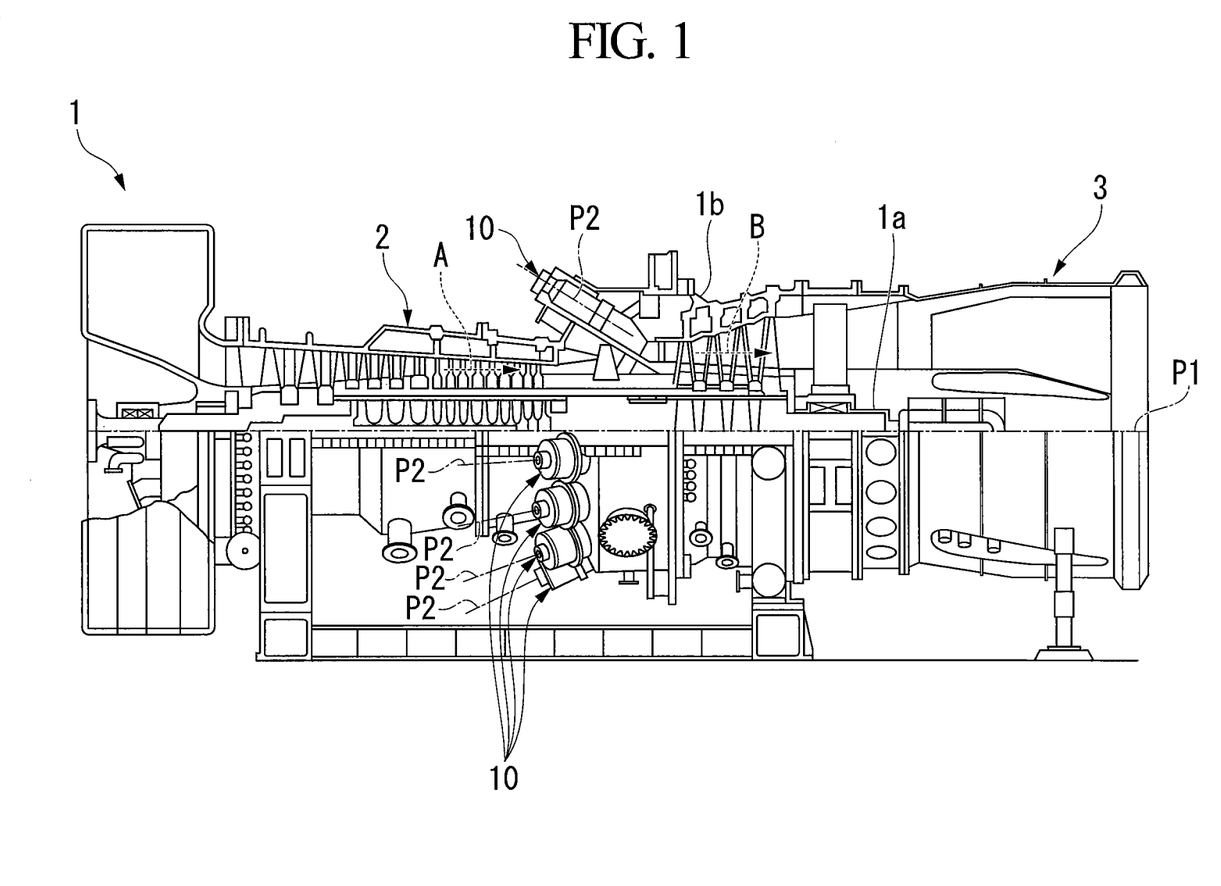
FIG. 1 is a schematic cross-sectional view illustrating an overall configuration of a gas turbine 1 according to a first embodiment of the present invention.

FIG. 1 is a schematic cross-sectional view illustrating an overall configuration of a gas turbine 1 according to a first embodiment of the invention.

As shown in FIG. 1, a rotational axis P1 of a rotor 1a is aligned with the horizontal direction, and the gas turbine 1 schematically includes a compressor 2, a plurality of combustors 10, and a turbine 3.

The compressor 2 generates compressed air A by receiving air as a hydraulic fluid.

As shown in FIG. 1, the plurality of combustors 10 communicates with the outlet of the compressor 2. The plurality of combustors 10 generates a high temperature/pressure combustion gas B by mixing the compressed air A supplied from the compressor 2 with fuel and burning the mixture.

The turbine 3 converts thermal energy of the combustion gas B fed from the combustor 10 into rotational energy of the rotor 1a. Then, the rotational energy is transferred to a generator (not shown) connected to the rotor 1a.

Figure 2:
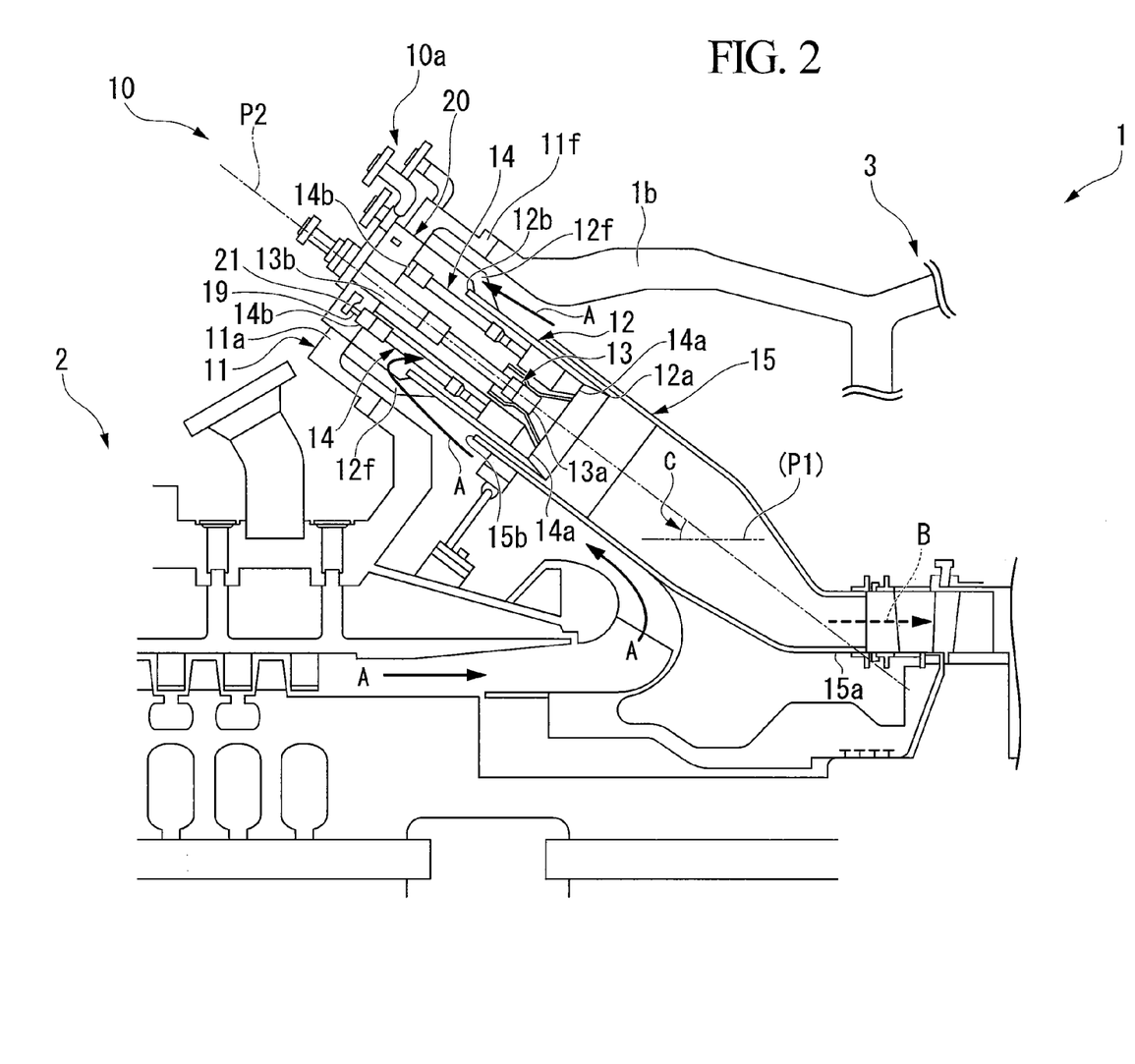
FIG. 2 is an enlarged cross-sectional view illustrating a combustor 10 according to the first embodiment of the present invention.

The combustors 2 are arranged in a radial shape in which the central axis P2 of each combustor is inclined with respect to the rotational axis P1 of the rotor 1a of the gas turbine 1 so that the inlet of the combustor 10 is more away from the rotational axis P1 in the radial direction than the outlet thereof Further, in FIG. 2, the angle formed between the central axis P2 of the combustor and the rotational axis P1 (the horizontal direction) is denoted by C.

FIG. 2 is an enlarged cross-sectional view illustrating the combustor 10.

Each combustor 10 is of a dual type capable of performing both gas combustion and oil combustion. As shown in FIG. 2, each combustor 10 includes an outer cylinder 11, an inner cylinder 12, a pilot nozzle 13, a main nozzle 14, and a tail cylinder 15. Further, in the first embodiment, the dual type combustor 10 having the pilot nozzle 13 and the main nozzle 14 is described as an example, but the type is not particularly limited as long as the fuel nozzle is capable of performing oil combustion.

In the following description, as long as there is no particular remark, the central axial direction (the direction of the central axis P2 of the combustor) of the combustor 10 is simply referred to as the "axial direction," the direction around the central axis P2 of the combustor is simply referred to as the "circumferential direction," and the radial direction of the combustor 10 is simply referred to as the "radial direction."

The central axis of the outer cylinder 11 is aligned with the central axis P2 of the combustor, and a flange 11f extending outward in the radial direction from the outer periphery of one axial end is fixed to a casing 1b. A base end portion 11a of the other axial end of the outer cylinder 11 is provided with a fuel supply portion 10a that supplies fuel gas and fuel oil to the main nozzle 14, and a nozzle tube base 20 that supports the main nozzle 14.

The diameter of the inner cylinder 12 is formed to be smaller than that of the outer cylinder 11, and the central axis is aligned with the central axis P2 of the combustor. The inner cylinder 12 is fixed to the outer cylinder 11 via a support portion 12f and the like extending in a radial shape from the vicinity of a base end opening 12b.

As shown in FIG. 2, the gap between the outer cylinder 11 and the inner cylinder 12 serves as the channel of the compressed air A, and the compressed air A is introduced from the base end opening 12b in the vicinity of the base end portion 11a of the outer cylinder 11 to the inside of the combustor.

The pilot nozzle 13 is formed in an elongated shape, and is disposed on the central axis P2 of the combustor. In the pilot nozzle 13, the base end 13b is supported by the nozzle tube base 20 and the like, and the vicinity of the front end 13a is surrounded by the inner cylinder 12. The pilot nozzle 13 forms a pilot flame from the front end 13a by using fuel gas or fuel oil supplied from the fuel supply portion 10a to the base end 13b.

The main nozzle 14 is formed in an elongated shape, and a plurality of (for example, eight) main nozzles are arranged at intervals in the circumferential direction. The plurality of main nozzles 14 extends in the axial direction with a gap in the radial direction from the central axis P2 of the combustor, where each base end 14b is supported by the nozzle tube base 20.

In each main nozzle 14, fuel is supplied from the base end 14b, and fuel is ejected from the front end 14a, thereby forming a premixed gas obtained from the compressed air and fuel. A gas supply tube (not shown) and an oil supply tube 19 are connected to the main nozzle 14, and the fuel gas and the fuel oil are supplied to the main nozzle 14 via the gas supply tube (not shown) and the oil supply tube 19, whereby the fuel gas and the fuel oil flow from the base end 14b to the front end 14a.

In the tail cylinder 15, a base end opening 15b is connected to a front end opening 12a of the inner cylinder 12, and a front end opening 15a communicates with the turbine 3. The tail cylinder 15 forms a flame (not shown) by burning the premixed gas formed by the main nozzle 14.

Figure 3:
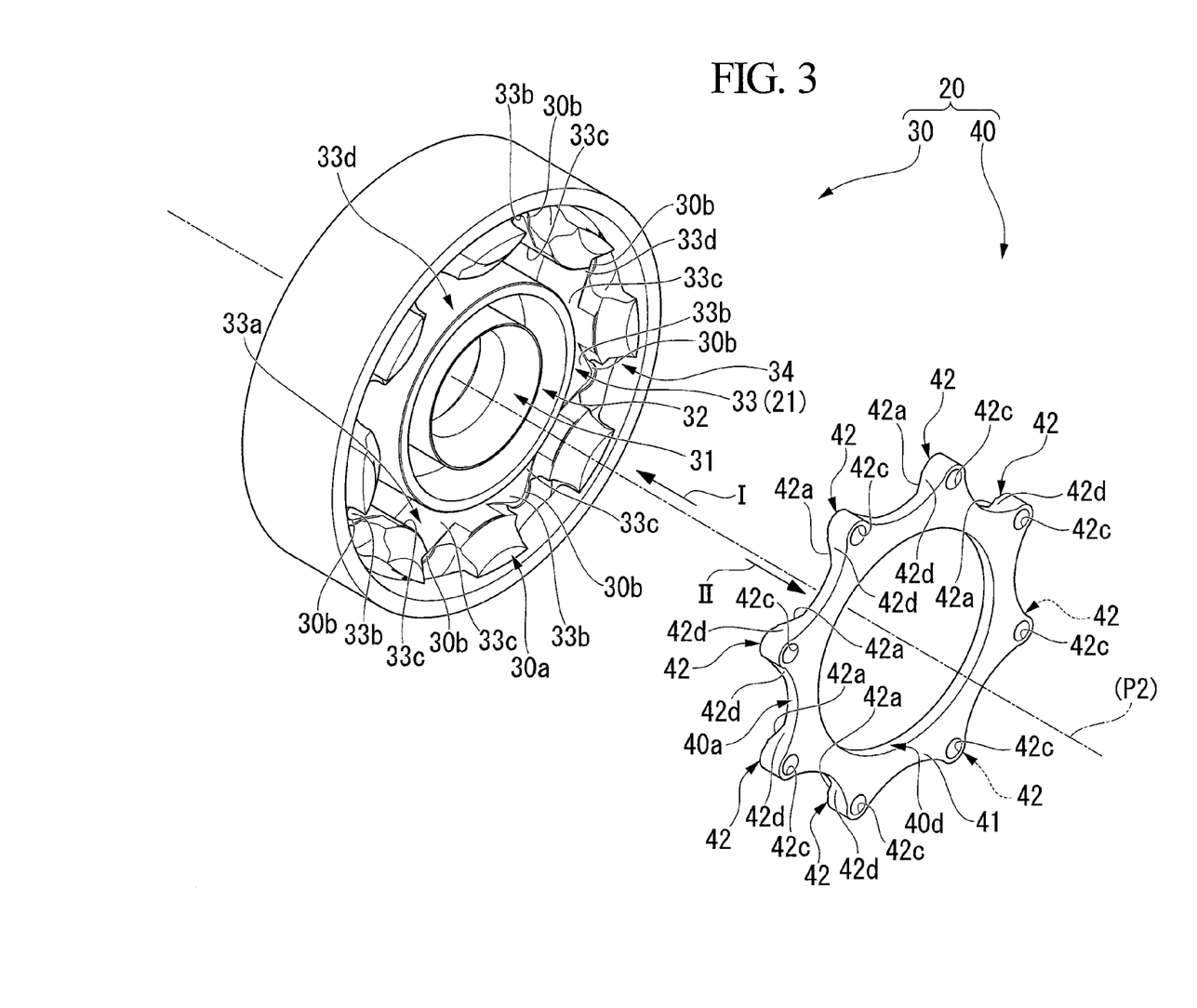
FIG. 3 is an exploded perspective view illustrating a nozzle tube base 20 according to the first embodiment of the present invention.
Figure 4:
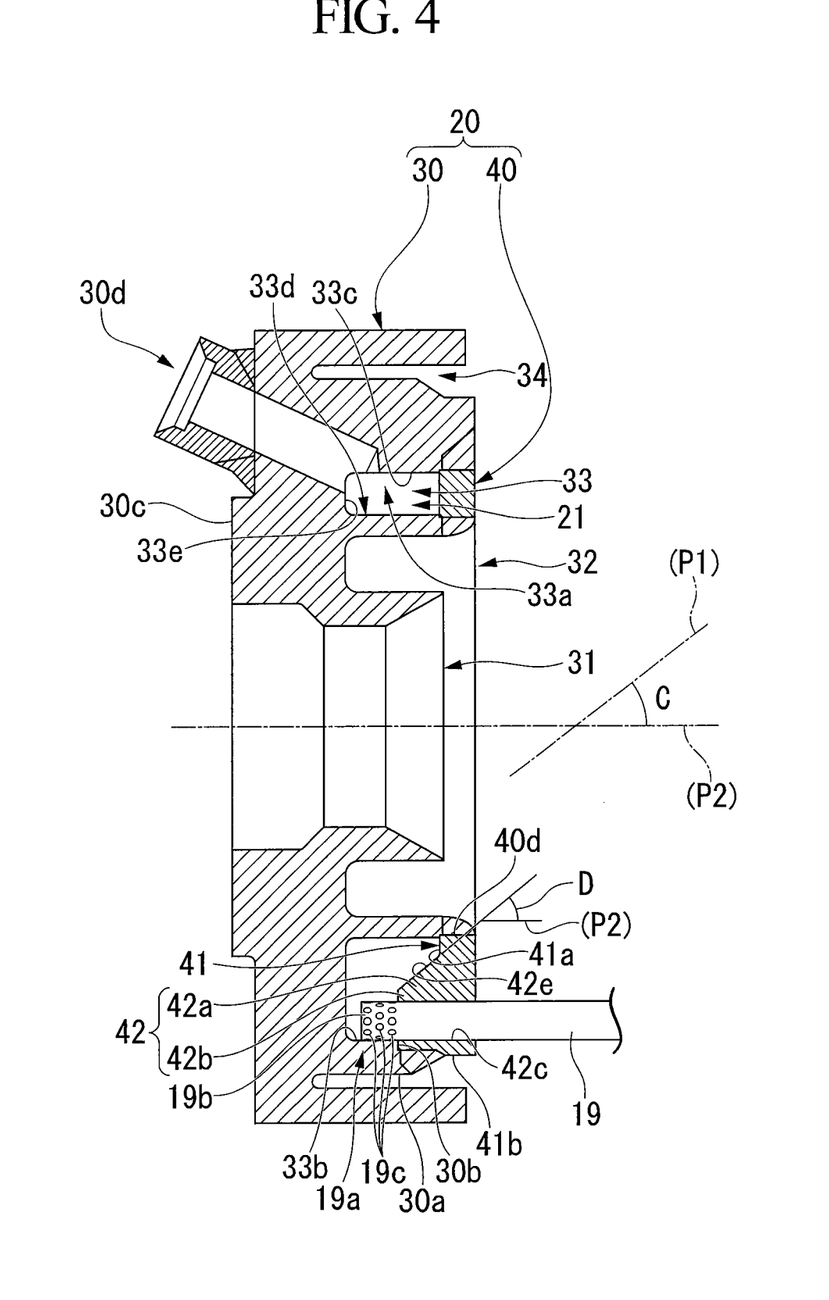
FIG. 4 is a longitudinal sectional view illustrating the nozzle tube base 20 according to the first embodiment of the present invention.

FIG. 3 is an exploded perspective view illustrating the nozzle tube base 20, and FIG. 4 is a longitudinal sectional view illustrating the nozzle tube base 20.

As shown in FIG. 3, the nozzle tube base 20 includes a disk-shaped tube base body (a first member) 30 and a cover body (a second member) 40. The nozzle tube base 20 is disposed in the outer cylinder 11 (refer to FIG. 2) while the central axis thereof is aligned with the central axis P2 of the combustor, and includes an annular oil chamber 21 that is surrounded by the tube base body 30 and the cover body 40.

Figure 5:
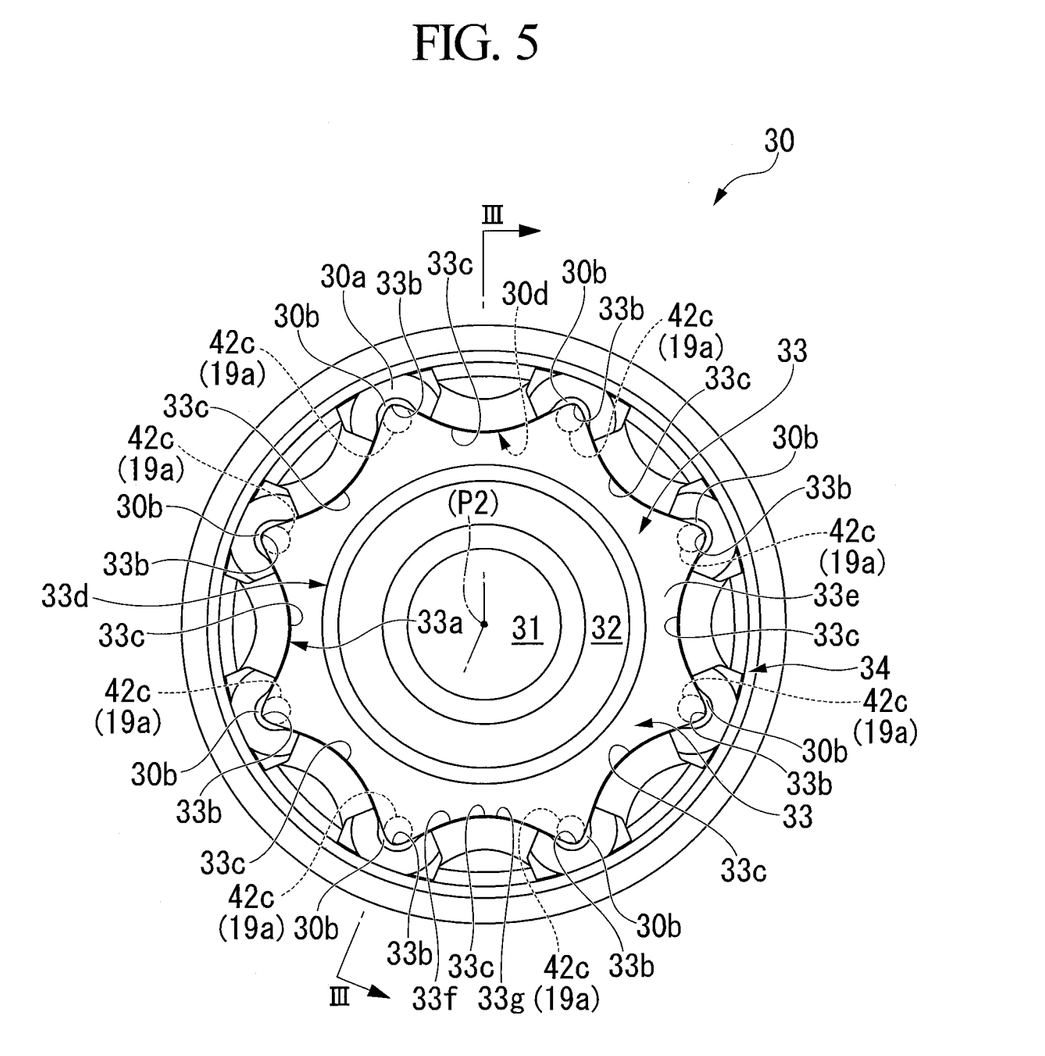
FIG. 5 is a schematic diagram illustrating a tube base body 30 according to the first embodiment of the present invention, and is a diagram when viewed in the direction I of FIG. 3.

FIG. 5 is a diagram when viewed in the direction I of FIG. 3. Further, in FIG. 5, the portion corresponding to the cross-section of FIG. 4 is depicted by the line III-III.

As shown in FIGS. 4 and 5, the tube base body 30 includes a central perforation hole 31 through which the pilot nozzle 13 is inserted; an inner peripheral groove 32 which surrounds the central perforation hole 31 so as to be coaxial with the central perforation hole 31; an oil groove 33; and an outer peripheral groove 34.

As shown in FIG. 5, the oil groove 33 is formed in a gear shape when viewed from the top thereof. Specifically, an inner end surface 33d of the oil groove 33 in the radial direction of the tube base body 30 is formed in an annular shape, and an outer end surface 33a of the oil groove 33 is formed in an uneven shape.

As shown in FIG. 5, the outer end surface 33a has a shape in which a tube disposing portion 33b formed to be concave outward in the radial direction of the tube base body 30 and a first guide portion 33c formed to be convex inward in the radial direction of the tube base body 30 are continuous in the circumferential direction of the tube base body 30. The first guide portion 33c is located between the adjacent tube disposing portions 33b, and includes a first inclination surface 33f which is inclined in a direction away from the center of the combustor as it becomes closer to one tube disposing portion 33b, and a second inclination surface 33g which is inclined in a direction away from the center of the combustor as it becomes closer to the other tube disposing portion 33b.

As shown in FIG. 5, the tube disposing portion 33b is recessed in a circular-arc shape outward in the radial direction of the tube base body 30 when viewed from the top thereof, and its curvature radius is set to be substantially the same as the outer radius of the oil supply tube 19. Eight tube disposing portions 33b are formed in the circumferential direction of the tube base body 30 at the same pitch.

As shown in FIG. 5, the first guide portion 33c protrudes in a circular-arc shape inward in the radial direction when viewed from the top thereof. The curvature radius of the first guide portion 33c is set to be larger than that of the tube disposing portion 33b. The first guide portion 33c is smoothly continuous to two tube disposing portions 33b adjacent to each other.

As shown in FIG. 4, a bottom surface 33e of the oil groove 33 extends in the circumferential direction at a predetermined position in the axial direction.

As shown in FIG. 5, a defining wall 30a formed between the oil groove 33 and the outer peripheral groove 34 is provided with a circular-arc-shaped receiving portion 30b which is formed to be lower by one stage than the edge of the tube disposing portion 33b and is capable of receiving a protrusion portion 42 of the cover body 40 to be described later.

Further, as shown in FIG. 4, a surface 30c opposite to a surface provided with the oil groove 33 of the tube base body 30 is provided with an oil feeding opening 30d which communicates with the oil groove 33 and is connected to the fuel supply portion 10a (refer to FIG. 2).

Figure 6:
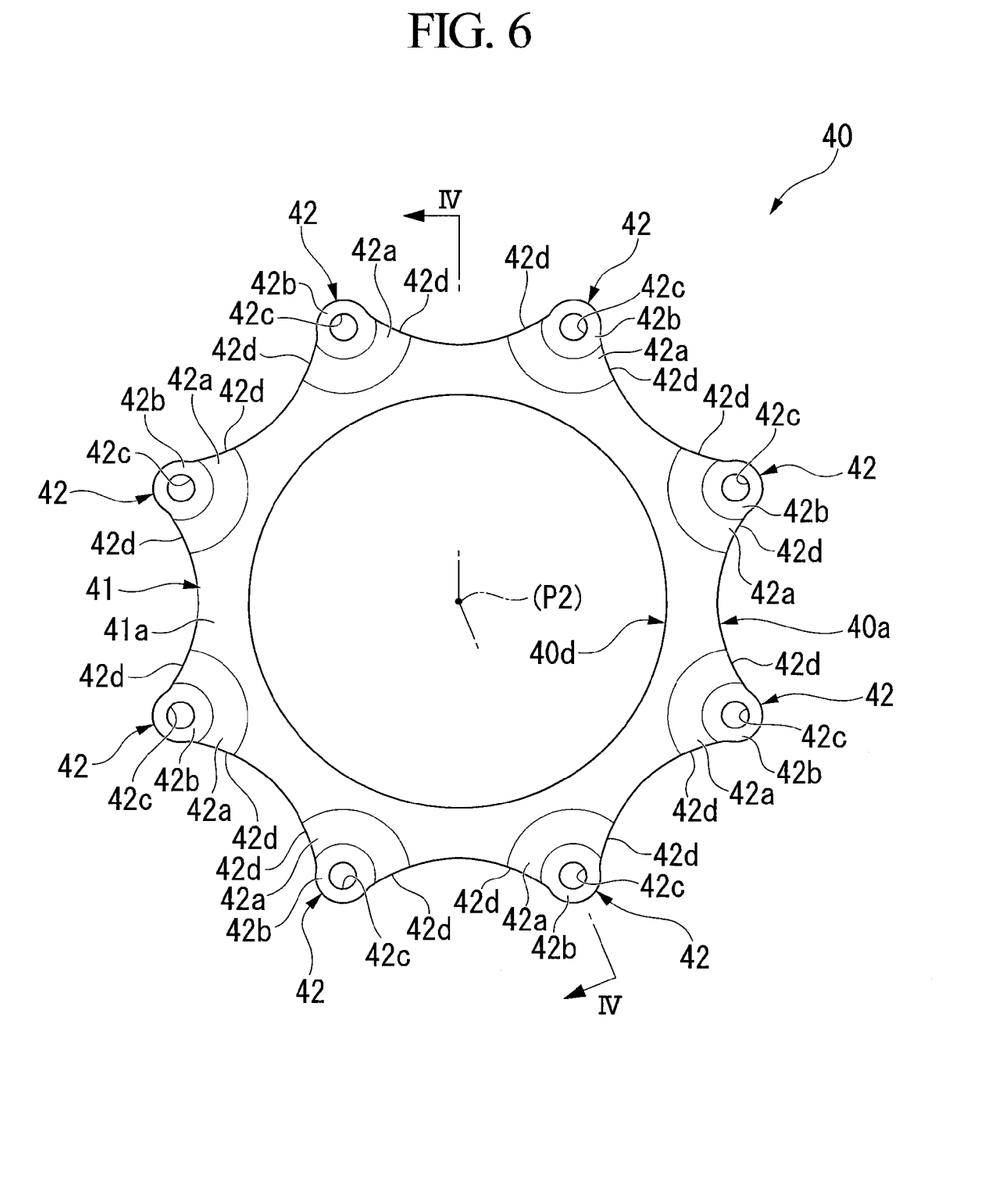
FIG. 6 is a schematic diagram illustrating a cover body 40 according to the first embodiment of the present invention, and is a diagram when viewed in the direction II of FIG. 3.
Figure 7:
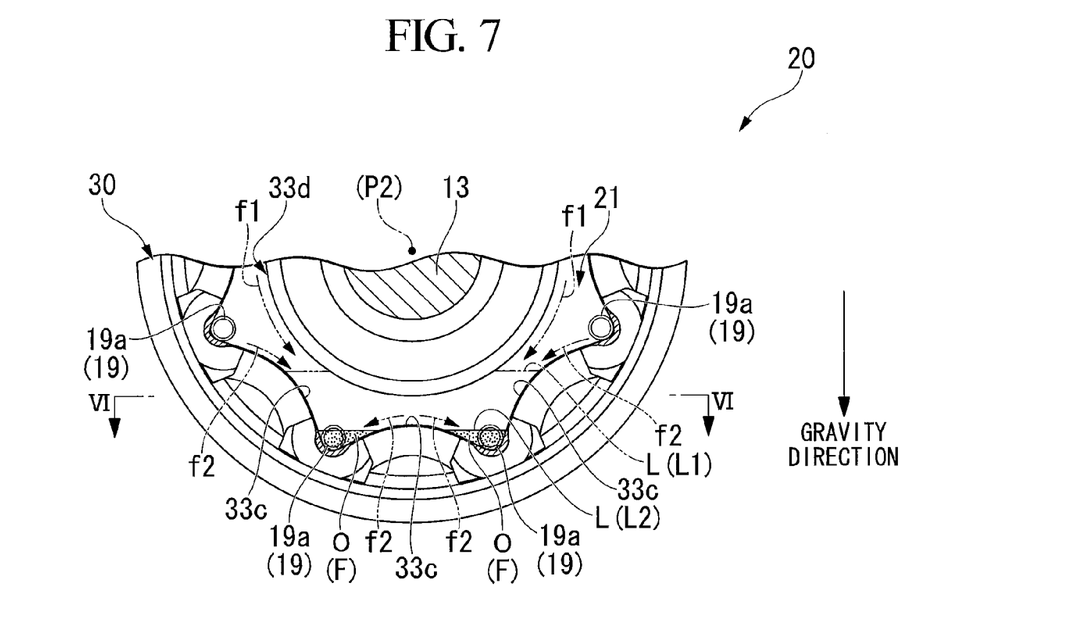
FIG. 7 is a first operation explaining diagram according to the first embodiment of the present invention, and illustrates the combustor 10 taking an orientation where a direction of a line drawn from the central axis P2 of an oil chamber 21 to the highest point of a first guide portion 33c coincide with the gravity direction.

FIG. 6 is a diagram when viewed in the direction II of FIG. 3, and FIG. 7 is a cross-sectional view taken along the line V-V of FIG. 6. Further, in FIG. 6, the portion corresponding to the cross-section of FIG. 4 is depicted by the line IV-IV.

As shown in FIG. 6, when viewed from the top of the cover body, the cover body 40 includes a plate portion 41 which is formed to be similar to the oil groove 33, and a protrusion portion 42 which is provided on the wall surface 41a of the plate portion 41 and protrudes in the axial direction from the portion protruding outward in the radial direction of the cover body 40.

In the plate portion 41, the overall circumferential length of the outer end surface 40a located on the outside of the cover body 40 in the radial direction is formed to be larger than the overall circumferential length of the outer end surface 33a of the oil groove 33, and the overall circumferential length of the inner end surface 40d located on the inside in the radial direction is formed to be smaller than the overall circumferential length of the inner end surface 33d of the oil groove 33.

As shown in FIG. 6, the protrusion portion 42 is formed in a substantially fan shape when viewed from the top thereof As shown in FIG. 4, the protrusion portion 42 includes a cylindrical portion 42b which is formed on the outside of the cover body 40 in the radial direction to have the same thickness, and a second guide portion 42a which is widened in a circular-arc shape inward in the radial direction of the cylindrical portion 42b to have a thickness which becomes gradually thinner as it moves away from the cylindrical portion 42b. Here, as shown in FIG. 4, the angle D formed between the central axis P2 of the combustor and a third inclination surface 42e as an inclination surface of the second guide portion 42a in the longitudinal section is set to be larger than the angle C formed between the rotational axis P1 and the central axis P2 of the combustor.

As shown in FIG. 4, the cover body 40 covers the oil groove 33 while the protrusion portion 42 faces the tube base body 30, and is fixed to the tube base body 30 by welding.

More specifically, while the cylindrical portion 42b abuts on the receiving portion 30b of the tube base body 30 (refer to FIG. 4), the second guide portion 42a is fitted to two first guide portions 33c (refer to FIG. 5) adjacent to each other in the circumferential direction (refer to FIG. 6), and an inclination end surface 42d of the second guide portion 42a comes into close contact with the first guide portion 33c. That is, the nozzle tube base 20 is obtained by a combination of the tube base body 30 (the first member) having the first guide portion 33c and the cover body 40 (the second member) having the second guide portion 42a, and the cover body 40 overlaps with the tube base body 30 while being aligned with the central axial direction of the combustor.

In this state, the first guide portion 33c is continuous to the second guide portion 42a in the circumferential direction of the tube base body 30. Further, as shown in FIG. 5, a part of the peripheral edge of the perforation hole 42c of the cylindrical portion 42b of the protrusion portion 42 of the cover body 40 is located so as to overlap with the tube disposing portion 33b of the tube base body 30 in the axial direction of the tube base body 30.

With such a configuration, the tube base body 30, the cover body 40, and the oil chamber 21 are formed. That is, the oil chamber is surrounded by an outer radial end surface 33a, an inner radial end surface 33d, and both axial wall surfaces (33e and 41a) inside the nozzle tube base 20, and is used to collect the fuel oil supplied from the oil feeding opening.

As shown in FIG. 4, each of the oil supply tubes 19 of eight main nozzles 14 is liquid-tightly inserted into each of eight perforation holes 42c of the nozzle tube base 20 with an O-ring or the like (not shown). The base end of each oil supply tube 19 reaching the oil chamber 33 is provided with an oil inflow portion 19a.

The oil inflow portion 19a includes a base end opening 19b which is opened in the axial direction and a plurality of perforation holes 19c which is formed in the tube wall of the oil supply tube 19 in the outer surface of the oil supply tube 19.

In each of the oil inflow portions 19a, the base end opening 19b is inserted to a position adjacently facing the bottom surface 33e of the tube base body 30. As shown in FIG. 5, the outer peripheral surface of the oil inflow portion 19a comes into contact with the tube disposing portion 33b by inserting the oil supply tube 19 into the perforation hole 42c overlapping with the tube disposing portion 33b when viewed in the axial direction. In other words, the downstream side of the oil inflow portion 19a of the oil supply tube 19 is surrounded by the cylindrical portion 42b. That is, the oil inflow portion 19a comes into contact with the area which is a part of the inner surface of the oil chamber 21 and is the farthest from the center of the combustor.

With such a configuration, eight oil inflow portions 19a are inserted into the oil chamber 21, and the oil supply tubes 19 and the oil chamber 21 constitute a fuel oil supply system. Here, a third inclination surface 42e is located to be closer to the vicinity of the front end of the combustor than the oil inflow portion 19a, and is inclined in a direction away from the center of the combustor as it becomes closer to the oil inflow portion 19a.

In the oil chamber 21 of the nozzle tube base 20 with the above-described configuration, the first guide portion 33c protruding toward the inner end surface 33d is located between two oil inflow portions 19a adjacent to each other in the circumferential direction in the outer end surface 33a, and is inclined in the circumferential direction toward the two oil inflow portions 19a. That is, the first guide portion 33c faces the center of the combustor inside the oil chamber 21, and oil remaining inside the oil chamber 21 is guided toward the oil inflow portion 19a. Then, the first guide portion 33c is located between the adjacent oil inflow portions 19a, and includes a first inclination surface 33f which is inclined in a direction away from the center of the combustor as it becomes closer to one oil inflow portion 19a and a second inclination surface 33g which is inclined in a direction away from the center of the combustor as it becomes closer to the other oil inflow portion 19a.

In addition, the second guide portion 42a of the oil chamber 21 protrudes toward the tube base body 30 in the axial direction from the vicinity of the oil inflow portion 19a when viewed in the axial direction, and is formed as a surface inclined in the axial direction toward the oil inflow portion 19a. That is, the second guide portion 42a faces the base end of the combustor inside the oil chamber 21, and guides the oil remaining inside the oil chamber 21 toward the oil inflow portion 19a. Then, the second guide portion 42a is provided with a third inclination surface 42e which is located to be closer to the front end of the combustor than the oil inflow portion 19a and is inclined in a direction away from the center of the combustor as it becomes closer to the oil inflow portion 19a.

Besides, the inner end surface 33d of the oil chamber 21 is formed to be convex toward the outer end surface 33a, and is inclined in the circumferential direction of the tube base body 30. That is, the inner end surface 33d is provided with the third guide portion which is formed to be convex outward in the radial direction of the combustor toward the outer periphery of the combustor inside the oil chamber 21 and to guide the oil remaining inside the oil chamber 21 to the fuel inflow portion 19a.

Further, as shown in FIG. 1, the plurality of combustors 10 is arranged in a radial shape while the central axis P2 of each of the combustors is inclined with respect to the rotational axis P 1. The nozzle tube bases 20 are arranged in a radial shape while having the same orientation with respect to the rotational axis P1 (the inclination of the central axis P2 with respect to the rotational axis P1, the positional relationship of the central axis P2 or the rotational axis P1 of each of the first guide portions 33c or each of the tube disposing portions 33b). Since the gravity direction of the combustors 10 arranged in a radial shape is different according to their disposal positions, the orientation of each of the nozzle tube bases 20 with respect to the gravity direction may not be uniform in some cases.

Next, the operation of the combustor 10 and the nozzle tube base 20 will be described by mainly referring to the operation explaining diagrams from FIGS. 7 to 11.

During the oil combustion operation, the supply of the fuel gas to the pilot nozzle 13 and the main nozzle 14 is stopped, and the fuel oil (hereinafter, marked with reference numeral F) is supplied from each of the fuel supply portions 10a.

In the main nozzle 14, the fuel oil F fed from the oil feeding opening 30d (refer to FIG. 4) is filled into the oil chamber 21, and the fuel oil F flows from the oil inflow portion 19a disposed in the oil chamber 21 into the oil supply tube 19 of each of the main nozzles 14.

In the following description, a case will be described in which the combustor 10 takes an orientation where a direction of a line drawn from the central axis P2 of the oil chamber 21 to the highest point of the first guide portion 33c coincide with the gravigy direction.

When the oil combustion operation or the gas combustion operation is selected, the supply of the fuel oil F to the oil chamber 21 is stopped. Then, the fuel oil F is discharged via each oil supply tube 19, and as shown in FIG. 7, the oil surface level L of the fuel oil F in the oil chamber 21 moves down (the oil surface level L1).

As the oil surface level L moves down, the area of the portion located above the oil surface in the inner end surface 33d increases. When the fuel oil f1 temporarily remains above the oil surface in the inner end surface 33d, as shown in FIG. 7, the fuel oil f1 is guided downward along the surface inclined in the circumferential direction of the inner end surface 33d, and is dropped into and merged with the oil surface.

Figure 8:
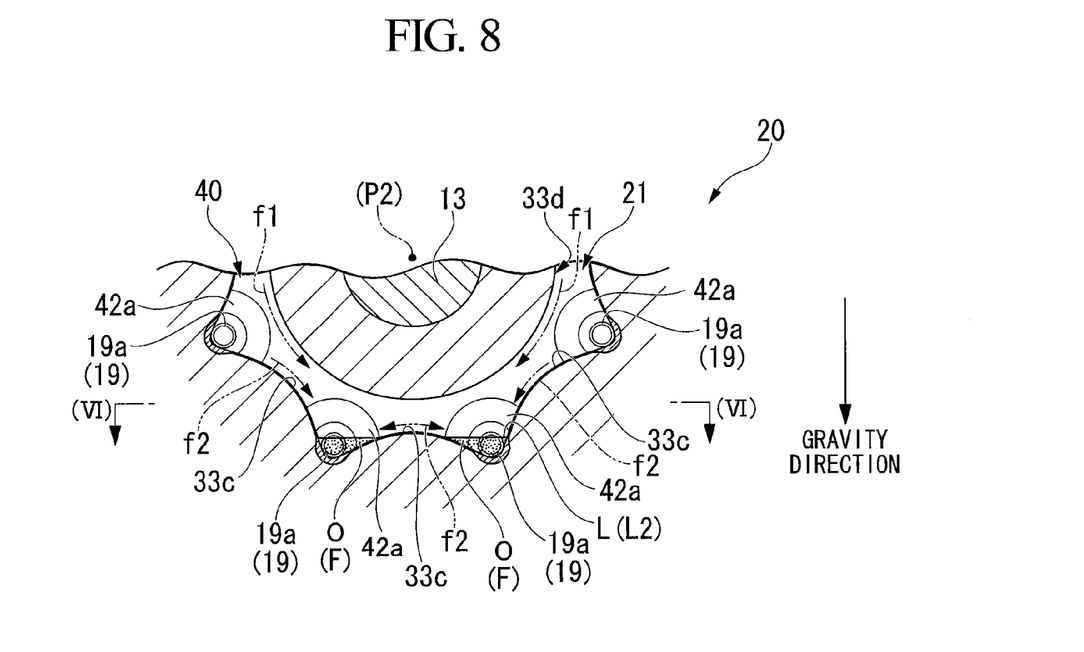
FIG. 8 is a second operation explaining diagram according to the first embodiment of the present invention, and illustrates the combustor 10 taking an orientation where the direction of the line drawn from the central axis P2 of the oil chamber 21 to the highest point of the first guide portion 33c coincide with the gravity direction.

Further, when the oil surface level L moves down, the first guide portion 33c located at the lowest position is located above the oil surface, and as shown in FIGS. 7 and 8, two oil storage portions O are formed on both sides of the first guide portion 33c in the circumferential direction (the oil surface level L2).

Since a part of the bottom of the oil storage portion O is defined by the first guide portion 33c, the circumferential length of the oil surface of the oil storage portion O gradually decreases as the amount of the oil in the oil storage portion O decreases. In addition, since a part of the bottom of the oil storage portion O is defined by the second guide portion 42a, the axial length of the oil storage portion O gradually decreases as the amount of the oil in the oil storage portion O decreases (refer to FIG. 9). That is, the area of the flow surface gradually decreases as the amount of the oil in the oil storage portion O decreases.

As shown in FIGS. 7 and 8, when the fuel oil f2 temporarily remains in the portion located above the oil surface in the two first guide portions 33c adjacent to each other in the circumferential direction of each oil storage portion O, the fuel oil f2 flows to the downstream side along the surface inclined in the circumferential direction of the first guide portion 33c. When the fuel oil f2 reaches the second guide portion 42a, as shown in FIG. 9, the fuel oil flows to the tube base body 30 in the axial direction along the surface of the second guide portion 42a and merges with the oil storage portion O where the oil inflow portion 19a is located.

Like this, the fuel oil F is collected toward the oil inflow portion 19a.

Figure 9:
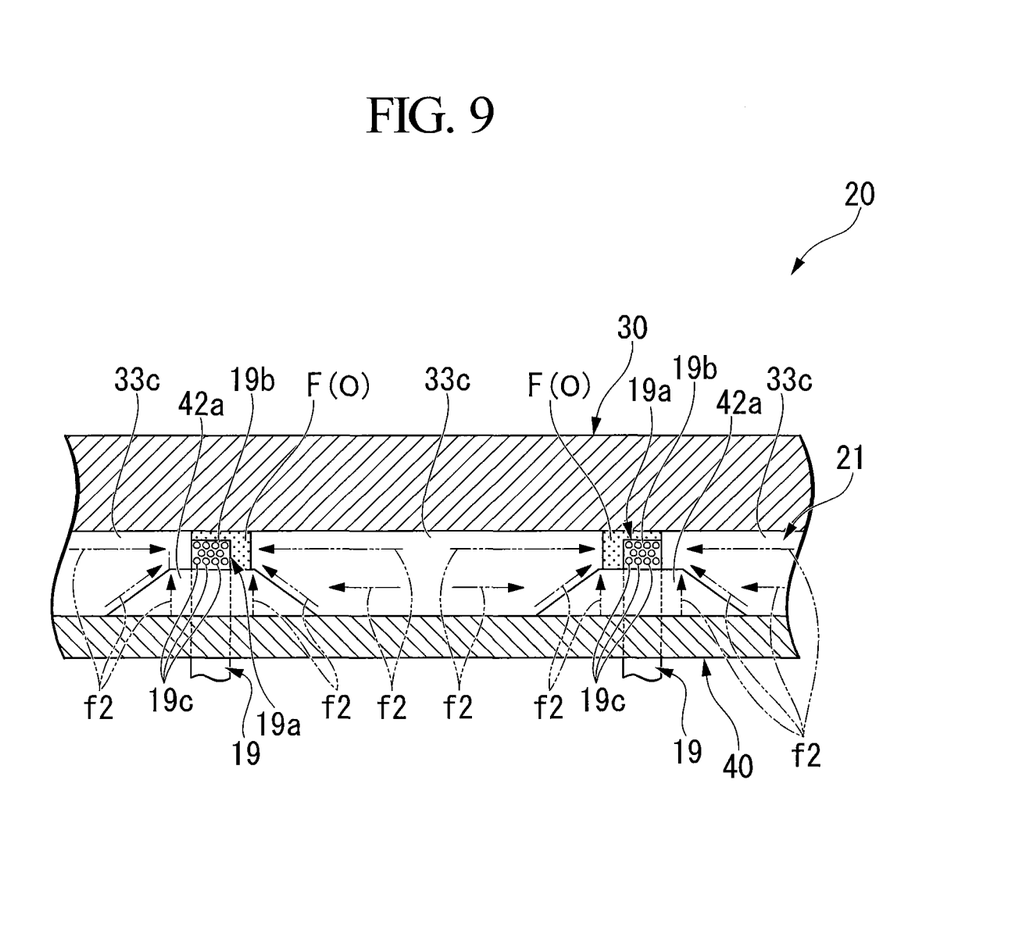
FIG. 9 is a third operation explaining diagram according to the first embodiment of the present invention, and is a cross-sectional view taken along the line VI-VI of FIG. 7.

As shown in FIG. 9, the fuel oil F collected in the vicinity of the oil inflow portion 19a sequentially flows into the oil supply tube 19 from the base end opening 19b (refer to FIG. 4) and the perforation hole 19c, and is discharged from the oil chamber 21.

After the amount of the oil in the oil storage portion O sufficiently decreases, high-pressure air or the like is supplied from the fuel supply portion 10a or the like so as to blow the fuel oil F into the oil supply tube 19 and to discharge the fuel oil F from the fuel ejection portion of the front end. At this time, since the outer peripheral surface of the oil inflow portion 19a comes into contact with the inner peripheral surface of the tube disposing portion 33b, the fuel oil F rarely remains in the gap between the outer peripheral surface of the oil inflow portion 19a and the inner peripheral surface of the tube disposing portion 33b.

Figure 10:
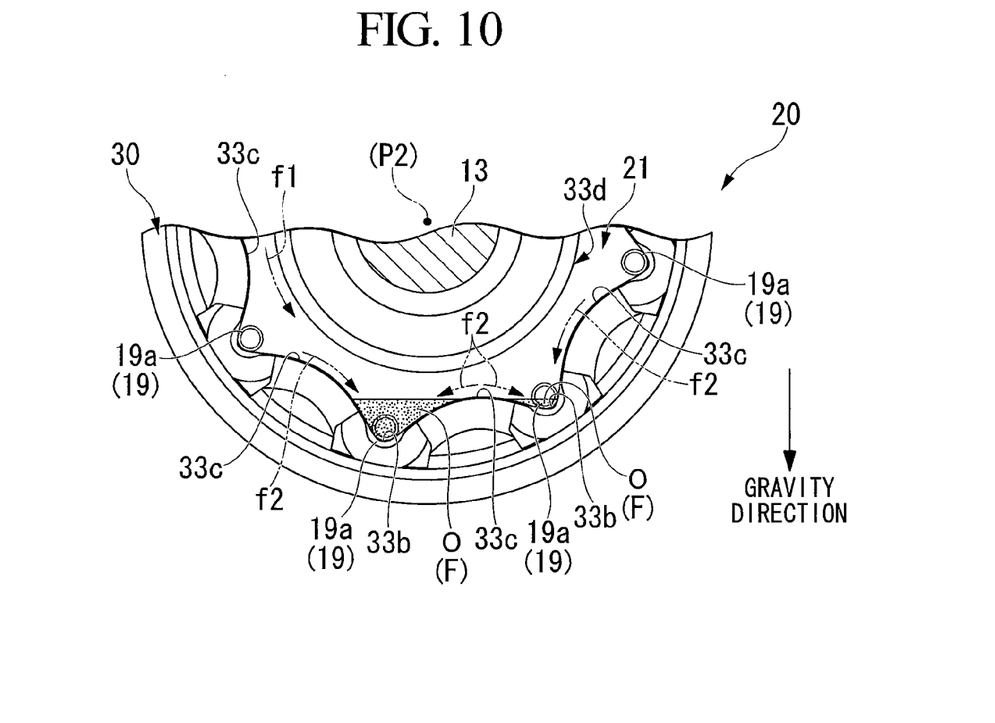
FIG. 10 is a fourth operation explaining diagram according to the first embodiment of the present invention, and illustrates the first combustor 10 taking an orientation where the direction of the line drawn from the central axis P2 of the oil chamber 21 to the highest point of the first guide portion 33c does not coincide with the gravity direction.
Figure 11:
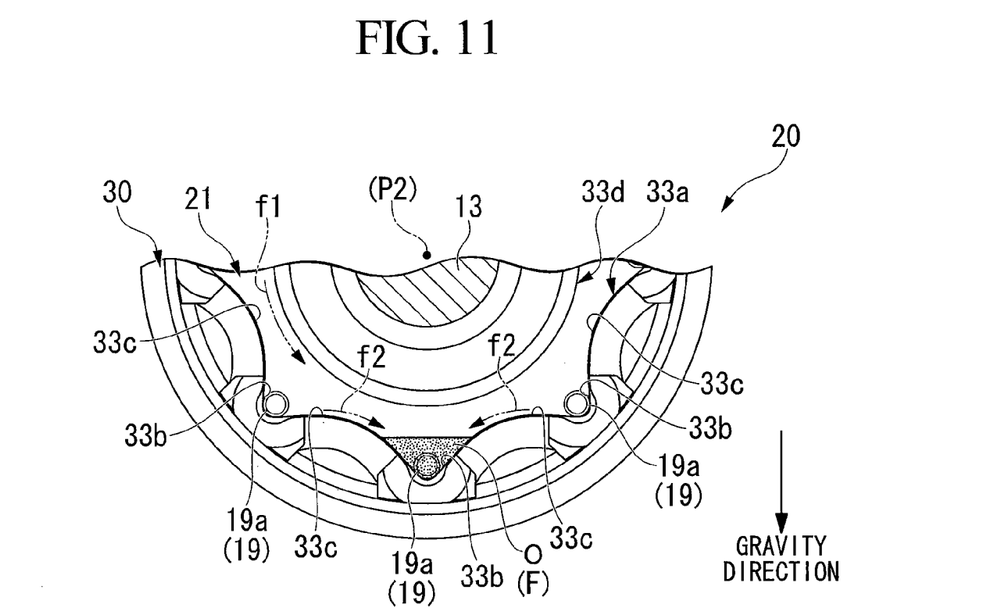
FIG. 11 is a fifth operation explaining diagram according to the first embodiment of the invention, and illustrates the second combustor 10 taking an orientation where the direction of the line drawn from the central axis P2 of the oil chamber 21 to the highest point of the first guide portion 33c does not coincide with the gravity direction.

Further, as shown in FIGS. 10 and 11, even in the combustors 10 which are in the orientation that a direction of a line drawn from the central axis P2 of the oil chamber 21 to the highest point of the first guide portion 33c does not coincide with the gravity direction, the fuel oil F is sufficiently removed in the same way. That is, the oil storage portion O is formed in the oil chamber 21 of each of the nozzle tube bases 20, and the fuel oil F is collected in the oil inflow portion 19a in the circumferential direction and the axial direction and is discharged from the oil chamber 21 via the oil supply tube 19.

In this way, the fuel oil F is sufficiently removed from the oil chamber 21 of the nozzle tube base 20 in each of the combustors 10.

As described above, according to the combustor 10 of the first embodiment, since the oil chamber 21 is provided with the first guide portion 33c, the first guide portion 33c guides the fuel oil F(f2) to at least one of the two oil inflow portions 19a adjacent to each other in the circumferential direction when discharging the fuel oil F from the oil chamber 21. In addition, since the oil chamber 21 is provided with the second guide portion 42a, the second guide portion 42a guides the fuel oil F(f2) on the second guide portion 42a toward the oil inflow portion 19a in the axial direction. In other words, the fuel oil F(f2) between the two oil inflow portions 19a adjacent to each other in the circumferential direction is guided toward at least one of the two oil inflow portions 19a, and the fuel oil F(f2) reaching the second guide portion 42a is guided toward the oil inflow portion 19a. Accordingly, since the fuel oil F(f2) is collected and discharged from the oil inflow portion 19a, it is possible to sufficiently remove the fuel oil F of the oil chamber 21.

Further, when the plurality of combustors 10 is arranged in a radial shape while the central axis P2 of the combustor is inclined with respect to the rotational axis P1, the orientation with respect to the gravity direction of each of the combustors 10 is different. Even in this case, according to the combustor 10 of the first embodiment, it is possible to sufficiently remove the fuel oil F in any orientation.

In particular, when the central axis P2 of the combustor 10 is inclined with respect to the horizontal direction, and the side of the oil inflow portion 19a of the oil supply tube 19 is higher than the downstream side, the fuel oil F easily remains on the downstream side of the oil inflow portion 19a in the axial direction. However, the angle D formed between the inclination surface of the second guide portion 42a and the axial direction is larger than the angle C formed between the rotational axis P1 and the central axis P2 of the combustor. For this reason, it is possible to guide the fuel oil F to the oil inflow portion 19a by using the second guide portion 42a, and to further reliably remove the fuel oil F without collecting the fuel oil F on the downstream side in the axial direction.

Further, even in the gas turbine in which the rotational axis P1 is not aligned with the horizontal direction, when the angle D formed between the inclination surface of the second guide portion 42a and the central axis P2 of the combustor is larger than the angle C formed between the central axis P2 of the combustor and the horizontal direction, it is possible to further reliably remove the fuel oil F.

Furthermore, since the outer peripheral surface of the oil inflow portion 19a comes into contact with the inner peripheral surface of the tube disposing portion 33b of the oil chamber 21, it is possible to suppress the oil F from remaining in the gap between the outer peripheral surface of the oil inflow portion 19a and the inner peripheral surface of the tube disposing portion 33b in the radial direction.

Besides, since the oil inflow portion 19a includes the base end opening 19b opened in the axial direction, it is possible to allow the fuel oil F to flow into the oil supply tube 19 in a simple configuration.

In addition, the oil inflow portion 19a includes the perforation hole 19c which is formed in a direction intersecting the axial direction. For this reason, it is possible to allow the fuel oil F to flow into the oil supply tube 19 from the downstream side of the base end opening 19b of the oil supply tube 19. The central axis P2 of the combustor 10 may be inclined with respect to the horizontal direction, and the oil inflow portion 19a of the oil supply tube 19 may be higher than the downstream thereof In particular, in this case, the fuel oil F easily remains on the downstream side of the oil inflow portion 19a in the axial direction, but the fuel oil F may be made to flow into the oil supply tube 19 from the downstream side of the oil supply tube 19. Accordingly, it is possible to sufficiently remove the fuel oil F without collecting the fuel oil F on the downstream side in the axial direction.

Further, the inner end surface 33d of the oil chamber 21 is formed to protrude toward the outer end surface 33a, and is inclined in the circumferential direction. For this reason, the fuel oil F(f1) on the inner end surface 33d of the oil chamber 21 is guided downward along the inner end surface 33d. Accordingly, since the fuel oil F(f1) is consequently collected and discharged to the oil inflow portion 19a, it is possible to sufficiently remove the fuel oil F(f1).

Furthermore, since the nozzle tube base 20 includes the tube base body 30 having the first guide portion 33c and the cover body 40 having the second guide portion 42a, the structure thereof is simple, and hence the assembling efficiency and the processing efficiency are excellent.

Besides, since the bottom surface 33e of the tube base body 30 faces the oil inflow portion 19a, and the oil supply tube 19 is inserted into the cover body 40, the structure thereof is simple, and hence the assembling efficiency and the processing efficiency are excellent.

Moreover, according to the gas turbine 1 having the combustor 10 of the first embodiment, when the oil combustion is switched to the gas combustion or the oil combustion is stopped, it is possible to sufficiently remove the fuel oil F of the oil chamber 21 of the combustor 10. Accordingly, it is possible to prevent the fuel oil supply system from being blocked by the carbonized fuel oil F. Further, when the combustor is activated or the gas fuel is not stably supplied in the dual type, it is possible to promptly and stably perform the oil combustion even in a backup operation or the like, and to improve the operational reliability of the gas turbine 1.

Second Embodiment

Figure 12:
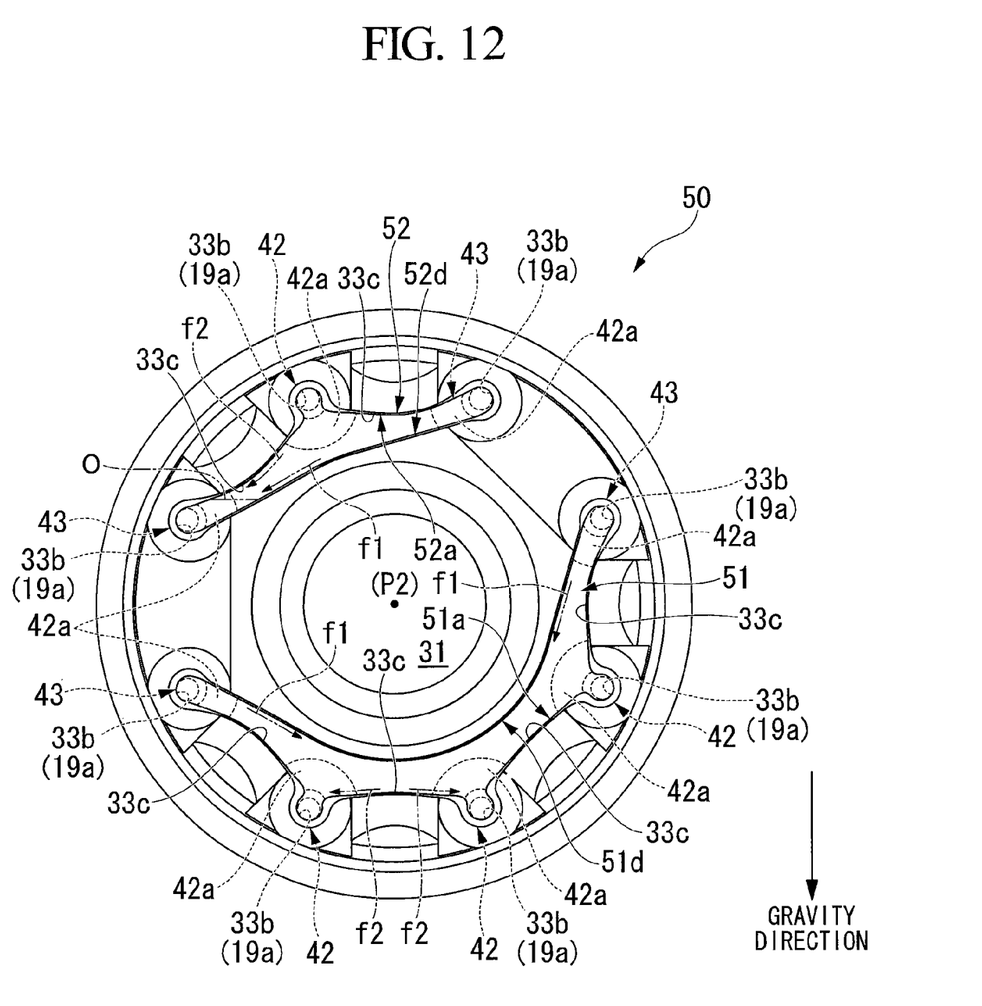
FIG. 12 is a schematic configuration diagram illustrating a nozzle tube base 50 according to the second embodiment of the invention.

FIG. 12 is a schematic configuration diagram illustrating a nozzle tube base 50 according to a second embodiment of the invention. Further, in FIG. 12, the same reference numerals will be given to the same components as those of FIGS. 1 to 11, and description thereof will be omitted.

As shown in FIG. 12, the nozzle tube base 50 includes an oil chamber 51 which is formed for five main nozzles 14 (refer to FIG. 2), and an oil chamber 52 which is formed for three main nozzles 14.

The oil chamber 51 is formed on the side of the rotational axis P1, and extends in a semi-circular-arc shape in the circumferential direction of the nozzle tube base 20.

The oil chamber 51 includes five tube disposing portions 33b at an outer end surface 51a located on the outside in the radial direction, and a first guide portion 33c is formed between the tube disposing portions 33b so as to smoothly connect them to each other.

Further, an inner end surface 51d located on the inside in the radial direction is formed to be convex in a substantially semi-circular-arc shape toward the outer end surface 51a, and is continuous to two tube disposing portions 33b at both ends of the circumferential direction of five tube disposing portions 33b.

The oil chamber 52 is formed at a position making a pair with the oil chamber 51 with the central axis P2 of the combustor interposed therebetween, and extends in one tangential direction of the nozzle tube base 50.

The oil chamber 52 includes three tube disposing portions 33b at the outer end surface 52a located on the outside in the radial direction, and the first guide portion 33c is formed between the tube disposing portions 33b so as to smoothly connect them to each other.

Further, the inner end surface 52d on the inside in the radial direction is slightly bent so as to protrude toward the outer end surface 52a, and is continuous to two tube disposing portions 33b at both ends in the circumferential direction among three tube disposing portions 33b.

The protrusion portions 43 at both ends of the oil chambers 51 and 52 are respectively fitted to the oil chambers 51 and 52, where the width of the second guide portion 42a is narrow.

According to the nozzle tube base 50 of the second embodiment, it is possible to obtain the same advantage as that of the above-described nozzle tube base 20. In addition, the fuel oil F(f1) temporarily remaining above the oil surface of the inner end surface 51d of the oil chamber 51 is guided toward the lower protrusion portion 43 along the surface of the inner end surface 51d, and the fuel oil F(f1) reaching the second guide portion 42a of the protrusion portion 43 is guided toward the oil inflow portion 19a.

Further, in the combustors 10 having different orientations in the gravity direction, even when the oil chamber 51 is located above the oil chamber 52, the fuel oil F(f1) temporarily remaining above the oil surface of the inner end surface 52d is guided toward the lower protrusion portion 43 along the surface of the inner end surface 52d, and the fuel oil F reaching the second guide portion 42a of the protrusion portion 43 is guided toward the oil inflow portion 19a. Accordingly, since the fuel oil F is collected and discharged from the vicinity of the oil inflow portion 19a, it is possible to sufficiently remove the fuel oil F from the oil chamber 51.

With this configuration, since the fuel oil F is collected and discharged from the vicinity of the oil inflow portion 19a regardless of the orientation with respect to the gravity direction, it is possible to sufficiently remove the fuel oil F of the oil chambers 51 and 52.

In addition, when the fuel oil F is supplied to one of the plurality of oil chambers 51 and 52, and the supply of the fuel oil F to the other thereof is stopped, it is possible to easily perform the partial load operation by ejecting the fuel oil F only from the main nozzle 14 corresponding to one oil chamber to which the fuel oil F is supplied. Further, since the fuel oil F is suppressed from remaining by providing the plurality of oil chambers 51 and 52, it is possible to perform the partial load operation and the rated load operation, and to promptly switch the partial load operation to the operation stop or vice versa.

Figure 13:
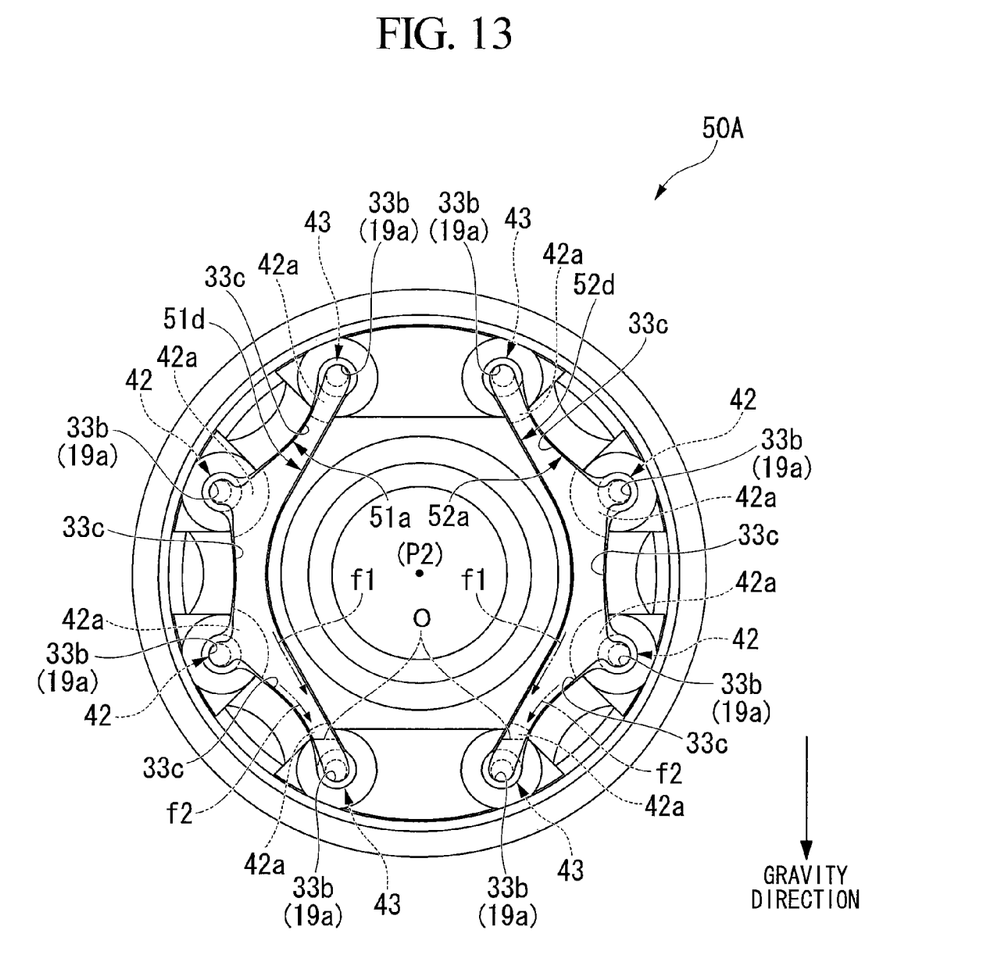
FIG. 13 is a schematic configuration diagram illustrating a nozzle tube base 50A which is a modified example of the nozzle tube base 50 according to the second embodiment of the invention.

FIG. 13 is an enlarged cross-sectional view illustrating a main part of a nozzle tube base 50A which is a modified example of the above-described nozzle tube base 20. Further, in FIG. 13, the same reference numerals will be given to the same components as those of FIGS. 1 to 12, and a description thereof will be omitted.

As shown in FIG. 14, the nozzle tube base 50A has the oil chambers 51 and 52 all formed for four main nozzles 14 (refer to FIG. 2), and four oil inflow portions 19a are disposed in each of the oil chambers 51 and 52.

Even in this configuration, it is possible to obtain the same advantage as that of the nozzle tube base 50 of the second embodiment.

Further, the operation sequence or the shape or combination of the respective components of the above-described embodiments is merely an example, and may be modified in various forms on the basis of design requirements or the like within the scope of the concept of the invention.

For example, in the first and second embodiments, eight oil inflow portions 19a are provided, but the number thereof is not limited when a plurality of the oil inflow portions 19a is provided.

In the first and second embodiments, the first guide portion 33c is formed in a circular-arc shape, but may be formed in a bent shape as in the inner end surface 52d of the oil chamber 52 of the second embodiment.

Further, the inner end surface 52d of the oil chamber 52 of the second embodiment may be formed in a circular-arc shape as in the inner end surface 51d of the oil chamber 51. In addition, the first guide portion 33c or the inner end surfaces 33d, 51d, and 52d may be formed in a polygonal shape when viewed from the top thereof to be inclined in the circumferential direction.

In the first and second embodiments, as shown in FIG. 4, the second guide portion 42a is formed in a linear shape when viewed from the cross-section thereof, but may be formed in a curved shape or a bent shape.

In the first and second embodiments, as shown in FIG. 4, the second guide portion 42a is formed in a circular-arc shape when viewed from the top thereof, but may be formed in other shapes (for example, a triangular shape or a polygonal shape when viewed from the top thereof).

In the first and second embodiments, the oil inflow portion 19a is formed by the base end opening 19b and the perforation hole 19c, but may be formed by any one of them.

In the above-described embodiments, the oil inflow portion 19a is formed to be inserted to a position adjacent to the bottom surface 33e of the tube base body 30, but may be disposed at a position adjacent to the cover body 40. In this case, for example, the second guide portion 42a may be disposed on the side of the tube base body 30.

Further, the nozzle tube bases 20, 50, and 50A are formed in a disk shape, but may be formed in any shape when the oil chamber can be formed. For example, the shape may be a rectangular shape, and when a plurality of oil chambers is provided, the chambers may be separated from each other.

INDUSTRIAL APPLICABILITY

According to the combustor of the invention, it is possible to sufficiently remove the fuel oil from the oil chamber.

Further, according to the gas turbine of the invention, it is possible to improve the operational reliability by sufficiently removing the fuel oil from the oil chamber.

REFERENCE SIGNS LIST

1: GAS TURBINE
2: COMPRESSOR
3: TURBINE

10: COMBUSTOR
11: OUTER CYLINDER
14: MAIN NOZZLE
14a: FRONT END
14b: BASE END
19: OIL SUPPLY TUBE
19a: OIL INFLOW PORTION
19b: BASE END OPENING
19c: PERFORATION HOLE
20: NOZZLE TUBE BASE
21: OIL CHAMBER
30: TUBE BASE BODY (FIRST MEMBER)
33a: OUTER END SURFACE
33c: FIRST GUIDE PORTION
33d: INNER END SURFACE
33f: FIRST INCLINATION SURFACE
33g: SECOND INCLINATION SURFACE
40: COVER BODY (SECOND MEMBER)
42a: SECOND GUIDE PORTION
42e: THIRD INCLINATION SURFACE
50, 50A: NOZZLE TUBE BASE
51: OIL CHAMBER
51a: OUTER END SURFACE
51d: INNER END SURFACE
52: OIL CHAMBER
52a: OUTER END SURFACE
52d: INNER END SURFACE
F, f1, f2: FUEL OIL
P2: CENTRAL AXIS OF COMBUSTOR

The invention claimed is:

1. A combustor comprising:
a plurality of nozzles which is arranged around the central axis of a combustor and of which each base end is connected to an oil supply tube;
a nozzle tube base which supports the plurality of nozzles and includes an oil chamber supplying fuel to the nozzles via an oil inflow portion provided in each oil supply tube;
a first guide portion which faces the central axis of the combustor inside the oil chamber and guides the oil remaining inside the oil chamber to the oil inflow portion; and
a second guide portion which faces away from the plurality of nozzles inside the oil chamber and guides the oil remaining inside the oil chamber to the oil inflow portion,
wherein the first guide portion includes a first inclination surface that is located between the adjacent oil inflow portions and is inclined in a direction away from the center of the combustor as the first inclination surface becomes closer to one oil inflow portion and a second inclination surface that is inclined in a direction away from the center of the combustor as the second inclination surface becomes closer to the other oil inflow portion, and
the second guide portion includes a third inclination surface that is located closer to the vicinity of the front end of the combustor than the oil inflow portion and is inclined in a direction away from the center of the combustor as the third inclination surface becomes closer to the oil inflow portion.

2. The combustor according to claim 1, wherein an angle formed between the third inclination surface and the central axis of the combustor is larger than an angle formed between the central axis of the combustor and the horizontal line.

3. The combustor according to claim 1, wherein the oil inflow portion comes into contact with an area which is a part of the inner surface of the oil chamber and is the farthest from the center of the combustor.

4. The combustor according to claim 1, wherein the oil inflow portion includes a base end opening which is formed in the oil supply tube and is opened toward the base end of the combustor.

5. The combustor according to claim 1, wherein the oil inflow portion includes a perforation hole which is formed in a tube wall of the oil supply tube.

6. The combustor according to claim 1, wherein the oil chamber includes a third guide portion which faces the outer periphery of the combustor inside the oil chamber, is formed to be convex outward in the radial direction of the combustor, and guides the oil remaining inside the oil chamber to the oil inflow portion.

7. The combustor according to claim 1, wherein the nozzle tube base includes a plurality of the oil chambers.

8. The combustor according to claim 1, wherein the nozzle tube base is formed by a combination of a first member including the first guide portion and a second member including the second guide portion, and the second member is disposed in the central axial direction of the combustor to overlap with the first member.

9. The combustor according to claim 8, wherein a base end opening of the oil inflow portion faces the first member, and the oil supply tube penetrates the second member.

10. A gas turbine comprising:
a compressor which compresses a hydraulic fluid;
the combustor which burns the hydraulic fluid compressed by the compressor and is described in any one of claims 1 to 9;
a turbine which is driven by the hydraulic fluid burned by the combustor.

* * * * *